(12) United States Patent
Downey et al.

(10) Patent No.: US 11,669,882 B2
(45) Date of Patent: Jun. 6, 2023

(54) SYSTEMS AND METHODS FOR IDENTIFYING ITEM SUBSTITUTIONS

(71) Applicant: The Boston Consulting Group, Inc., Boston, MA (US)

(72) Inventors: Richard Downey, San Francisco, CA (US); Shirish Dhar, Boston, MA (US); Adam Whybrew, New South Wales (AU)

(73) Assignee: The Boston Consulting Group, Inc., Boston, MA (US)

( * ) Notice: Subject to any disclaimer, the term of this patent is extended or adjusted under 35 U.S.C. 154(b) by 0 days.

(21) Appl. No.: 17/806,385

(22) Filed: Jun. 10, 2022

(65) Prior Publication Data

US 2022/0301037 A1    Sep. 22, 2022

Related U.S. Application Data

(63) Continuation-in-part of application No. 17/514,434, filed on Oct. 29, 2021, which is a continuation of application No. 17/015,863, filed on Sep. 9, 2020, now Pat. No. 11,321,763.

(60) Provisional application No. 63/362,351, filed on Apr. 1, 2022, provisional application No. 63/362,274, filed on Mar. 31, 2022, provisional application No. 63/003,527, filed on Apr. 1, 2020.

(51) Int. Cl.
| | |
|---|---|
| *G06Q 30/00* | (2023.01) |
| *G06Q 30/0601* | (2023.01) |
| *G06N 3/08* | (2023.01) |
| *G06Q 30/0283* | (2023.01) |
| *G06F 18/214* | (2023.01) |

(52) U.S. Cl.
CPC ....... *G06Q 30/0631* (2013.01); *G06F 18/214* (2023.01); *G06N 3/08* (2013.01); *G06Q 30/0283* (2013.01); *G06Q 30/0633* (2013.01)

(58) Field of Classification Search
CPC .......... G06Q 30/0631; G06Q 30/0283; G06Q 30/0633; G06K 9/6256; G06N 3/08
See application file for complete search history.

(56) References Cited

U.S. PATENT DOCUMENTS

| | | | |
|---|---|---|---|
| 2003/0105682 A1* | 6/2003 | Dicker | G06Q 30/0253 705/26.8 |
| 2010/0324985 A1 | 12/2010 | Kumar et al. | |
| 2014/0278778 A1 | 9/2014 | Regan | |
| 2014/0358633 A1 | 12/2014 | Wu et al. | |

(Continued)

OTHER PUBLICATIONS https://web.archive.org/web/20190331174919/https://www.data-to-viz.com/graph/dendrogram.html (Year: 2019).*

(Continued)

*Primary Examiner* — Matthew E Zimmerman
(74) *Attorney, Agent, or Firm* — DLA Piper LLP (US)

(57) ABSTRACT

Systems and methods for identifying item substitutions. History information can be collected. The history information can include one or more episodes from one or more customers. Each episode can include one or more items. The history information can be transformed into a matrix of observed substitutions. A neural network can be trained on the matrix of observed substitutions to generate item embeddings. Input including an item can be received. A substitution similarity between the item and another item based on the item embeddings can be identified.

24 Claims, 12 Drawing Sheets

(56) References Cited

U.S. PATENT DOCUMENTS

| | | | | |
|---|---|---|---|---|
| 2015/0339756 | A1* | 11/2015 | Konik | G06F 16/3325 |
| | | | | 705/26.7 |
| 2016/0125048 | A1 | 5/2016 | Hamada | |
| 2017/0185585 | A1 | 6/2017 | Applegate et al. | |
| 2017/0185894 | A1 | 6/2017 | Volkovs et al. | |
| 2019/0179915 | A1* | 6/2019 | Yoon | G06F 16/219 |
| 2019/0347607 | A1 | 11/2019 | Shi et al. | |
| 2020/0043022 | A1* | 2/2020 | Karmakar | G06F 16/322 |
| 2020/0074517 | A1 | 3/2020 | Meier et al. | |

OTHER PUBLICATIONS

Dziugaite, Gintare Karolina, and Daniel M. Roy. "Neural network matrix factorization." arXiv preprint arXiv:1511.06443 (Year: 2015).*

Baskoro. Neural Network Embedding for SKU Representation in Mapan. Retrieved from the internet: URL:https://medium.com/@jatmiko.budi/neural-network-embedding -for-sku-representation-in-mapan-c0bc20951b9e, (May 21, 2019).

Conneau, A., Lample, G., Ranzato, M. A., Denoyer, L., & Jégou, H. (2017). Word translation without parallel data. arXiv preprint arXiv:1710.04087.

Yin, Z., & Shen, Y. (2018). On the dimensionality of word embedding. In Advances in Neural Information Processing Systems (pp. 887-898).

Mikolov, Tomas, et al. "Distributed representations of words and phrases and their compositionality." Advances in neural information processing systems. 2013.

Mikolov, Tomas, et al. "Efficient estimation of word representations in vector space." arXiv preprint arXiv:1301.3781 (2013).

Gidi Shperber, A Gentle Introduction to Doc2Ved: https://medium.com/wisio/a-gentle-introduction-to-doc2vec-db3e8c0cce5e) (10 pages), Jul. 26, 2017.

Le, Quoc, and Tomas Mikolov. "Distributed representations of sentences and documents." International conference on machine learning. 2014.

Maaten, Laurens van der, and Geoffrey Hinton, "Visualizing data using t-SNE," Journal of machine learning research, Nov. 9, 2008: 2579-2605.

Aug. 20, 2020, Wikipedia article on cluster analysis (e.g., see https://en.wikipedia.org/wiki/Cluster_analysis.

Aug. 18, 2020, Wikipedia article https://en.wikipedia.org/wiki/Machine_learning.

International Search Report issued in PCT/US2021/025078 dated Jun. 4, 2021.

Written Opinion issued in PCT/US2021/025078 dated Jun. 4, 2021.

Chen et al., "Prodcut2Vec: Understanding Prodcut-Level Competition Using Representation Learning", NYU Stern School of Business, 55 pages, Jan. 14, 2020.

U.S. Appl. No. 17/514,434.

* cited by examiner

|        | Item 1 | Item 2 | Item 3 | Item 4 | Item 5 |
|--------|--------|--------|--------|--------|--------|
| Item 1 | 1      | 0.98   | 0.7    | 0.2    | 0.1    |
| Item 2 | 0.98   | 1      | 0.25   | 0.5    | 0.6    |
| Item 3 | 0.7    | 0.25   | 1      | 0.6    | 0.8    |
| Item 4 | 0.2    | 0.5    | 0.6    | 1      | 0.1    |
| Item 5 | 0.1    | 0.6    | 0.8    | 0.1    | 1      |

SYSTEMS AND METHODS FOR IDENTIFYING ITEM SUBSTITUTIONS

CROSS-REFERENCE TO RELATED APPLICATIONS

This application is a continuation-in-part of U.S. patent application Ser. No. 17/514,434 filed Oct. 29, 2021, entitled "SYSTEMS AND METHODS FOR USING SKU VECTOR INFORMATION," which is a continuation of U.S. patent application Ser. No. 17/015,863 filed Sep. 9, 2020, which claims priority to U.S. Provisional Application No. 63/003,527 filed Apr. 1, 2020. This application also claims priority to U.S. Provisional Application No. 63/362,351, filed Apr. 1, 2022, entitled "SYSTEMS FOR GENERATING INDIVIDUALIZED MESSAGING USING STOCK-KEEPING UNITS," and U.S. Provisional Application No. 63/362,274, filed Mar. 31, 2022, entitled "METHODS FOR ANALYZING AND PREDICTING CUSTOMER BEHAVIOR." The entirety of each is incorporated by reference herein.

BRIEF DESCRIPTION OF THE DRAWINGS

Aspects and embodiments of this application are depicted in the figures, wherein:

FIG. 4B illustrates an example item similarity matrix in accordance with an embodiment.

DETAILED DESCRIPTION OF EMBODIMENTS

Figure 1:
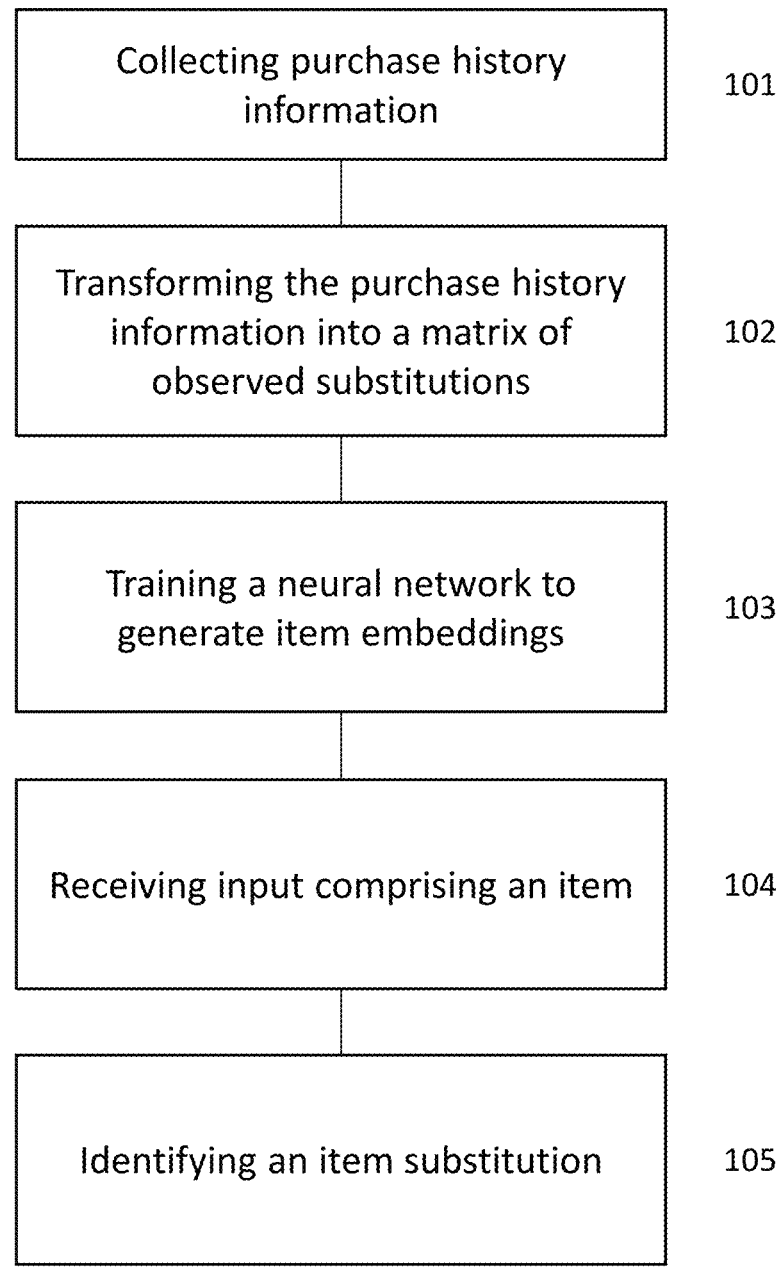
FIG. 1 depicts a flow diagram of a method for identifying an item substitution in accordance with an embodiment.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the term "need state" refers to a group of items that represent a unique customer need. For example, a shopper may generally only purchase a single salty snack in a single shopping trip but may vary between potato chips, corn chips, and pretzels on varying trips. A "need state" may be based on a single customer or any plurality of customers (e.g., all shoppers at a given storefront or shoppers between the ages of 35 and 45). A "need state" may include one or more potential similar, or substitution, items. A customer may have a preferred choice item of the one or more substitution items.

As used herein, the term "shopping mission" means a singular trip to one or more stores or a single online checkout. A "shopping mission" may comprise one or more need states of an associated customer. For example, a first customer may plan a shopping mission to purchase milk and eggs, while a second customer plans a shopping mission to restock their entire pantry. Though many embodiments may reference a physical storefront, one of ordinary skill in the art will recognize that the systems and methods described herein may be similarly applicable to an online store.

As used herein, the term "basket" refers to shopping basket comprising the items purchased on a specific shopping mission.

As used herein, the singular forms "a," "an," "the," and "said," etc. include plural references unless the context clearly dictates otherwise. Thus, for example, reference to a "cell" is a reference to one or more cells and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components as well as the range of values greater than or equal to 1 component and less than or equal to 3 components. Similarly, a group having 1-5 components refers to groups having 1, 2, 3, 4, or 5 components, as well as the range of values greater than or equal to 1 component and less than or equal to 5 components, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

While the present disclosure has been illustrated by the description of exemplary embodiments thereof, and while the embodiments have been described in certain detail, the Applicant does not intend to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

Typical methods of analyzing and presenting products, in a retail environment, rely on broad product categorization centered on branding. Branding, though important to the consumer, does not fully encapsulate the consumer decision-making process. Current methods for consumer-centric product categorization may only incorporate information generated from surveys. Surveys may suffer from issues of reliability and validity. Systems and methods are needed for capturing the consumer decision-making process and need states to better inform product presentation.

Referring to FIG. 1, a flow diagram for a method of identifying an item substitution 100 is depicted in accordance with an embodiment. In certain embodiments, the method 100 may include collecting purchase history information 101. In some embodiments, the purchase history information may include purchase history from one or more customers. In further embodiments, the one or more customers may represent a target demographic. In some embodiments, a target demographic may be selected based on any available customer information (e.g., home address, purchase location, age, date/time of purchase, average shopping episode cost, average shopping episode margin, customer loyalty, etc.). In some embodiments, the purchase history may correspond to a single customer.

In certain embodiments, the purchase history information may catalog one or more purchased items. In some embodiments, the purchased items may be encoded in the purchase history information. In further embodiments, the purchased items may be referenced via stock-keeping units (SKUs). An SKU is a number that may be used to differentiate products and/or track inventory. Products may be assigned different SKU numbers based on various characteristics such as, but not limited to: price, manufacturer, color, style, type, or size, or any combination thereof. An SKU may be generated using an SKU generator. An SKU may be read using a scanner (e.g., a barcode reader or RFID reader). In some embodiments, the purchase history information may associate each purchased item with a shopping episode. As an example, the information from each receipt may be stored in a database. In some embodiments, the purchase history information may associate each purchased item or shopping episode with a customer. In further embodiments, the information may include a customer identifier derived from a payment method (e.g., a credit or debit card) or a loyalty program. In some embodiments, the purchase history information may include demographic information associated with the customer. In some embodiments, the purchase history information may include additional information associated with the purchase, including at least one of a date, time, and purchase location. In some embodiments, the purchase information may include additional information associated with each of the purchased items including at least one of a price, a margin, or a discount status.

Figure 2:
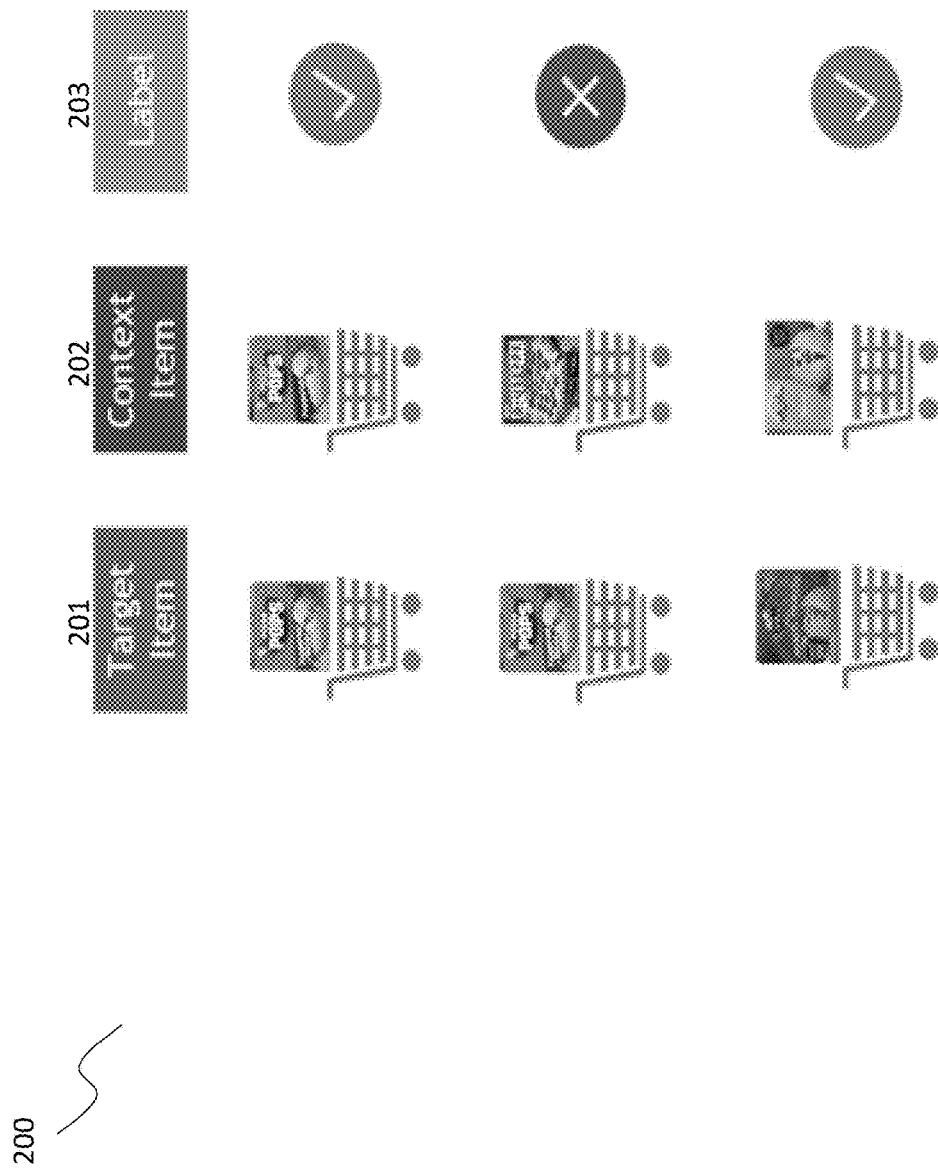
FIG. 2 illustrates a matrix of labeled observed substitutions in accordance with an embodiment.

In certain embodiments, the method 100 may include transforming the purchase history information into a matrix of observed substitutions 102. Briefly referring to FIG. 2, a matrix 200 of labeled observed substitutions is depicted in accordance with an embodiment. In some embodiments, the matrix may include target items 201, context items 202, or a label 203 identifying the corresponding context item 202 as a substitute for the corresponding target item 201, or any combination thereof. In some embodiments, the target items 201 may include a subset of all purchased items in the purchase history information. In some embodiments, each target item 201 may be compared to context items 202 including a subset of every other purchased item. In some embodiments, the label 203 may be binary (e.g., 1 for positive pairing, 0 for a negative pairing). In some embodiments, a positive paring in the label 203 may be identified when target item 201 and context item 202 were purchased by the same customer and/or never, or infrequently, purchased together. In some embodiments, the labeling of target items 201 and/or context items 202 may be performed on a customer-by-customer basis.

In certain embodiments, multiple matrices 200 may be produced in batches. In some embodiments, a batch may include 32 entries. In some embodiments, positive parings may be prioritized for inclusion in a batch. In some embodiments, a sampling method may be employed to select negative parings. In further embodiments, the sampling method may be log uniform sampling such that more popular items are sampled more frequently. In some embodiments, multiple batches may be generated through the transformations described herein. In further embodiments, a specified number of batches may be generated.

In certain embodiments, the matrix 200 may be stored as a matrix. In other embodiments, the matrix 200 may be stored as a series of arrays representing the target items 201, context items 202, and labels 203. A person of ordinary skill in the art will recognize that the matrix could be stored and reduced in multiple manners.

Figure 3:
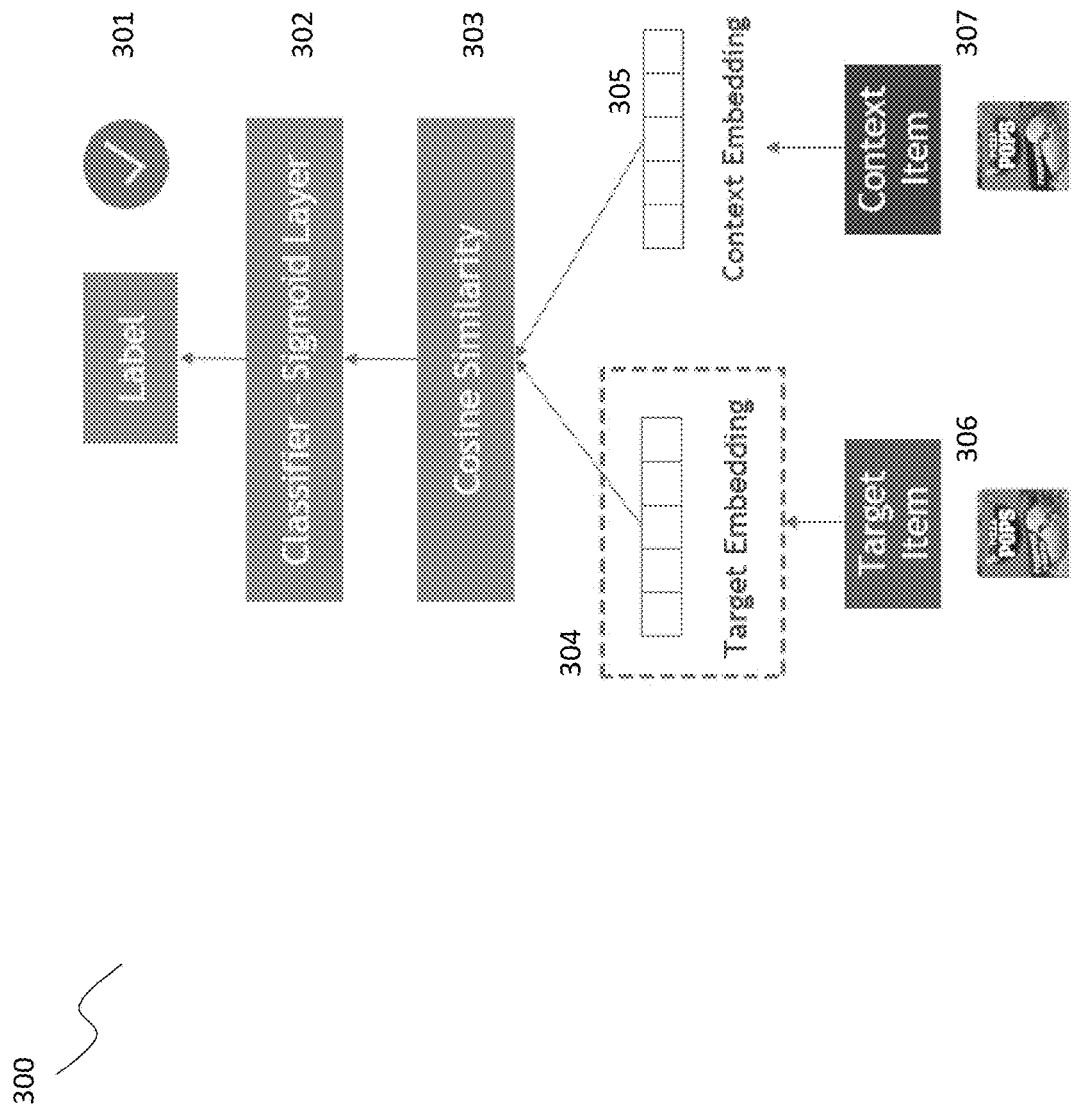
FIG. 3 depicts a flow diagram of a method for generating item embeddings in accordance with an embodiment.

In certain embodiments, the method 100 may include training a neural network to generate item embedding 103. Embeddings (e.g., vector representations of items) can transform something with a large number of dimensions (e.g., whether or not an item is one of many thousands of possibilities) to a smaller number (e.g., 100 numbers, where the similarity between items has real-world meaning). In some embodiments, the neural network is trained on the observed substitutions matrix 200. The neural network may be trained to predict the likelihood of a target item and a context item being substitutes. Briefly referring to FIG. 3, an example flow diagram of a machine learning algorithm for generating item embeddings 300 is depicted in accordance with an embodiment. In some embodiments, a target item 306 and/or a context item 307 may be one-hot encoded and transferred into a vector embedding. In some embodiments, the embeddings can be a sequence of numbers (e.g., 100 numbers, or any other amount of numbers). In some embodiments, the vector embeddings may have a length of 256. In some embodiments, the initial target embedding 304 and context embedding 305 may be random.

In certain embodiments, the machine learning algorithm 300 may converge the target embedding 304 and context embedding 305 to similar values when the items are positive pairs. In some embodiments, the machine learning algorithm 300 may diverge the target embedding 304 and context embedding 305 to distant values when the items are negative pairs. As an example, Customer A may frequently purchase one of a variety of healthy crackers, and one of a variety of potato chips together in a shopping episode. Customer B may frequency purchase just one of either a cracker or potato chip in a shopping episode. As a result, the neural network may closely converge the embedding values for each type of healthy cracker, and each type of potato chips, while less closely converging the embedding values for the healthy crackers and the potato chips.

In certain embodiments, training the machine learning algorithm 300 may include determining a similarity between the target embedding 304 and the context embedding 305. In some embodiments, determining a similarity may include calculating a cosine similarity 303 between the target embedding 304 and the context embedding 305. Embeddings which are very close may have a cosine similarly close to 1.

In certain embodiments, training the machine learning algorithm 300 may include classifying the context item 307 as a substitute of the target item 306. In some embodiments, the classifier may transform the similarity value into a probability that the context item 307 is a substitute of the target item 306. In further embodiments, the classifier may include a threshold or function for mapping the probability to a classification. In some embodiments, the classifier may be a sigmoid function 302.

In certain embodiments, the classified value may be compared to the label 301 to optimize the machine learning algorithm 300. In some embodiments, a loss function may be used to optimize the algorithm 300. In further embodiments, the loss function may be a binary cross entropy loss function. A person of ordinary skill in the art will recognize that alternative similarity metrics, classifiers, and/or optimization functions may define an embedding vector space with similar properties.

Referring to FIG. 1, the method 100 may include receiving input comprising an item 104. In some embodiments, the method 100 may include identifying a substitution of the item 105. In some embodiments, identifying a substitution may include identifying an item, from a subset of all items with embeddings, with the closest embedding to the received item 104. In some embodiments, identifying a substitution may include identifying an item, from a subset of all items with embeddings, within a threshold range to the received item 104. In some embodiments, multiple substitution items may be identified.

Figure 4A:
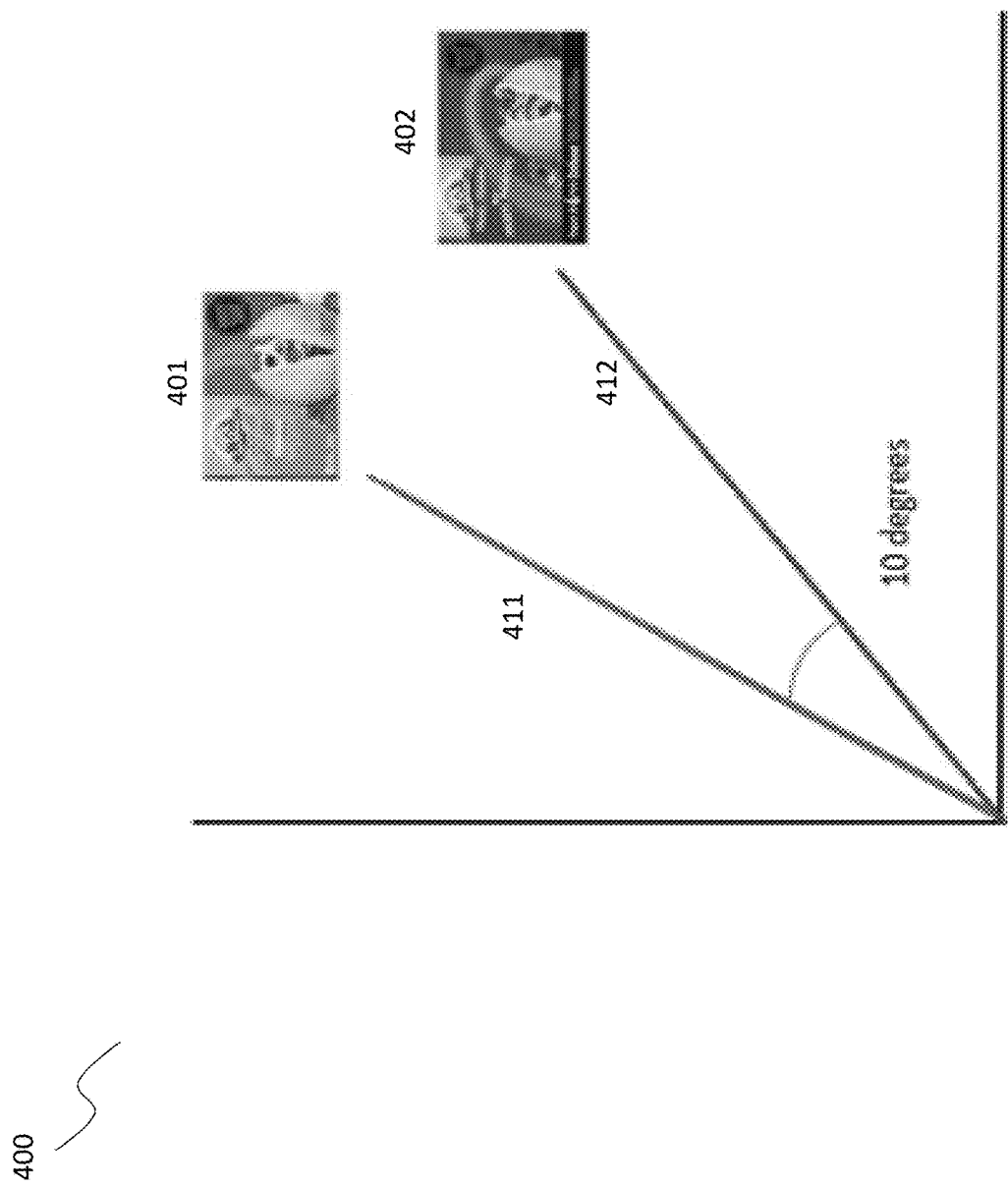
FIG. 4A illustrates a similarity calculation between two items in a vector space in accordance with an embodiment.

Referring to FIG. 4A, an example similarity calculation between two items in a vector space 400 is illustrated in accordance with an embodiment. In some embodiments, the similarity calculating may be include determining a cosine similarity. In the example, item 401 has an embedding 411 which is 10 degrees from item 402 embedding 412. The cosine of 10 is 0.98 suggesting a similarity of 98%.

Referring to FIG. 4B, an example similarity matrix is depicted in accordance with an embodiment. In some embodiments, the calculated similarity between some subset of the items in the vector space is stored in a similarity matrix. In some embodiments, identifying an item substitution may include looking up the highest similarity values in a column or row associated with the given item.

Figure 5:
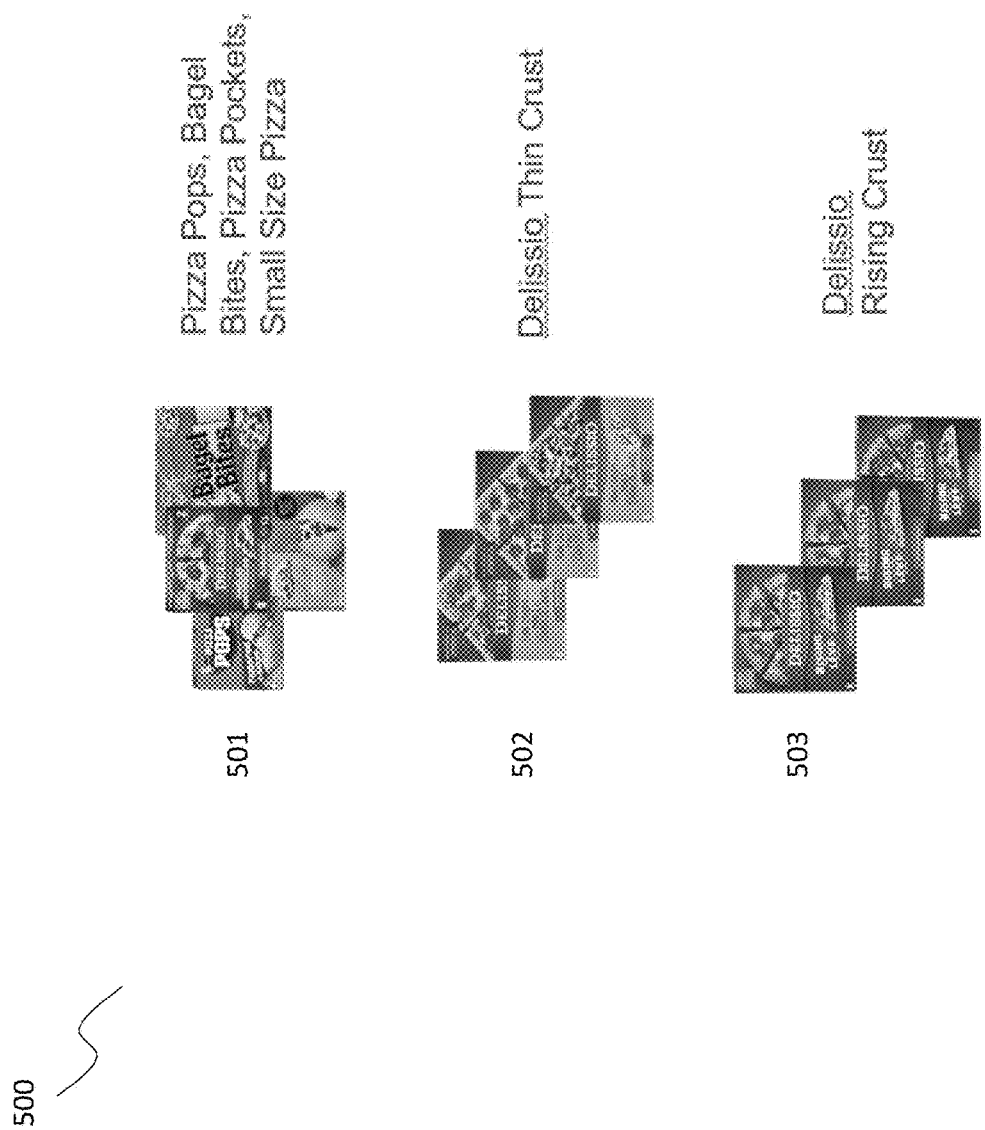
FIG. 5 illustrates an example item clustering based on item similarity in accordance with an embodiment.

In certain embodiments, clustering may be performed on a set of similarity data, such as a similarity matrix, to determine need states. As a need state defines a set of items fitting a specific customer need (e.g., the items are substitutions), a need state may cross brands and price points. In some embodiments, the clustering model may be hierarchical clustering. FIG. 5 depicts a set of example needs states determined for frozen pizza 500. The example need states appear to suggest that customers treated kids and snack-size pizzas 501 as substitutions, but purchased larger pizza based on crust 502/503.

In certain embodiments, a set of similarity data, such as a similarity matrix, may be used to generate a customer decision tree. A customer decision tree may depict the decisions an average customer makes in choosing an item from a set of similar items in a tiered manner based on the similarity of the items. In some embodiments, a customer decision tree may illustrate item similarity through a dendrogram. In some embodiments, need states may be derived from the customer decision tree. In further embodiments, deriving need states from the customer decision tree may include determining a threshold difference in similarity between items. In other embodiments, needs states may be derived by a clustering model. In some embodiments, need states may be derived from a hierarchal tier threshold in the customer decision tree.

Figure 6:
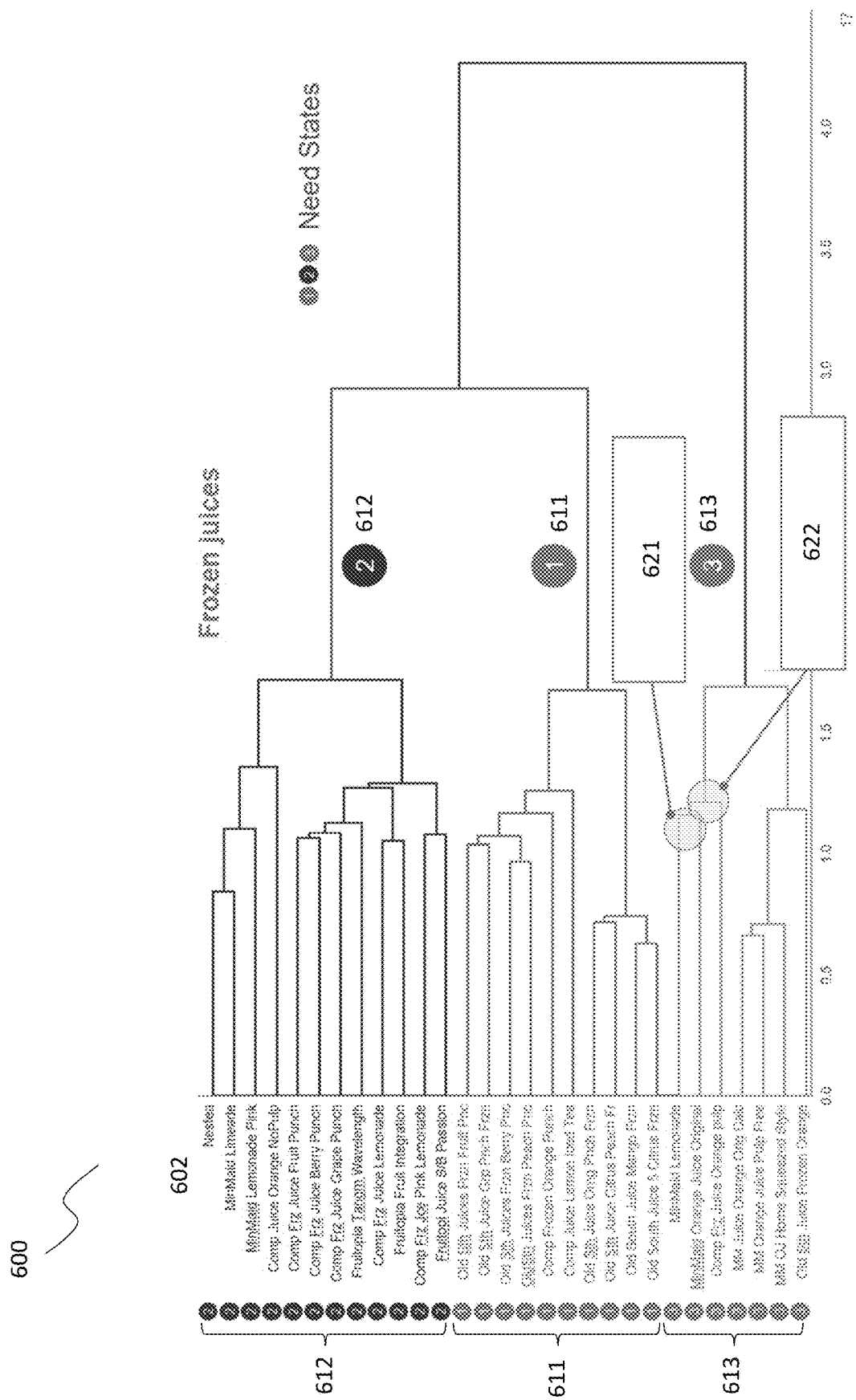
FIG. 6 illustrates a customer decision tree based on item similarity in accordance with an embodiment.

FIG. 6 illustrates an example customer decision tree 600 in accordance with an embodiment. The customer decision tree 600 depicts the taxonomic relationship between a set of items 602 based on their similarity. In the example, three need states 611/612/613 are defined. As depicted in the customer decision tree 600, the items in Need State One 611 are more similar to the item in Need State Two 612 than the items in Need State Three 613. The customer decision tree branches based on the level of similarity between the items in each branch. As an example, a single brand's lemonade and original orange juice were substituted more often 621 than either of those products with another brand of frozen orange juice 622.

The systems and methods described herein may provide useful metrics for managing one or more storefronts. As an example, need states may be used to optimize product placement and spacing in a store to aid in or promote certain customer decisions. In other examples, need states may be applied to improve the personalization and optimization of offers and promotions.

Example: Store Facing Elasticity Curves

Figure 7:
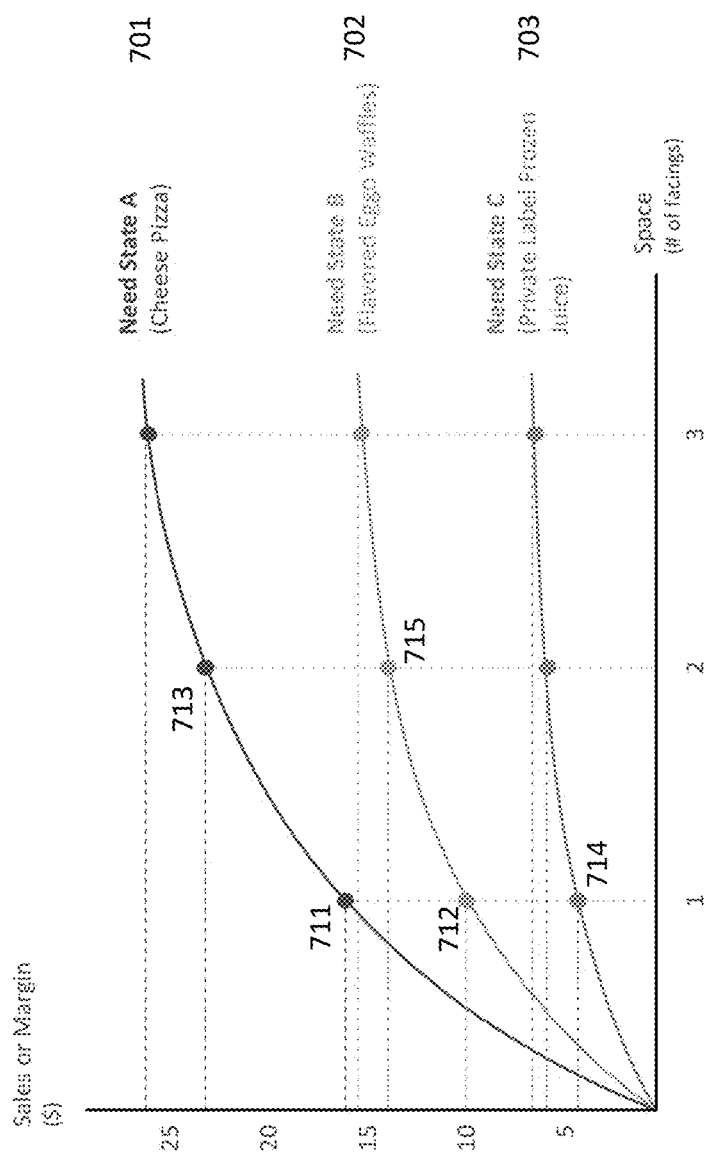
FIG. 7 illustrates the graphical relationship between sales and spacing for a set of example need states in accordance with an embodiment.

FIG. 7 illustrates example space elasticity curves 700 for three need states. Each need state can be logged to determine a relationship between the sales and/or margin of the items in the need state versus the number of spacings the item is provided in the store. In some embodiments, the sales and/or margin may be normalized (e.g., over time). Spacings may then be chosen based on the highest incremental change in sales/margin for the number of spacings. In the example, five spacings are available. The elasticity curves 700 suggest that Need State A 701 should be chosen for the first spacing due to having the highest sales/margin of $16.00 711. Need State B should be chosen for the second spacing with the highest remaining sales/margin of $10.00 712. As the incremental change in sales/margin for Need State A having two spacings 713, at $7.00 ($23.00–$16.00) is still higher than Need State C at one spacing 714, at $4.00, Need State A should also receive the third spacing. The method may continue to assign any remaining spaces (i.e., to Need Space C 714 and then Need Space B 715).

Example: Store Facing Arrangement

Figure 8:
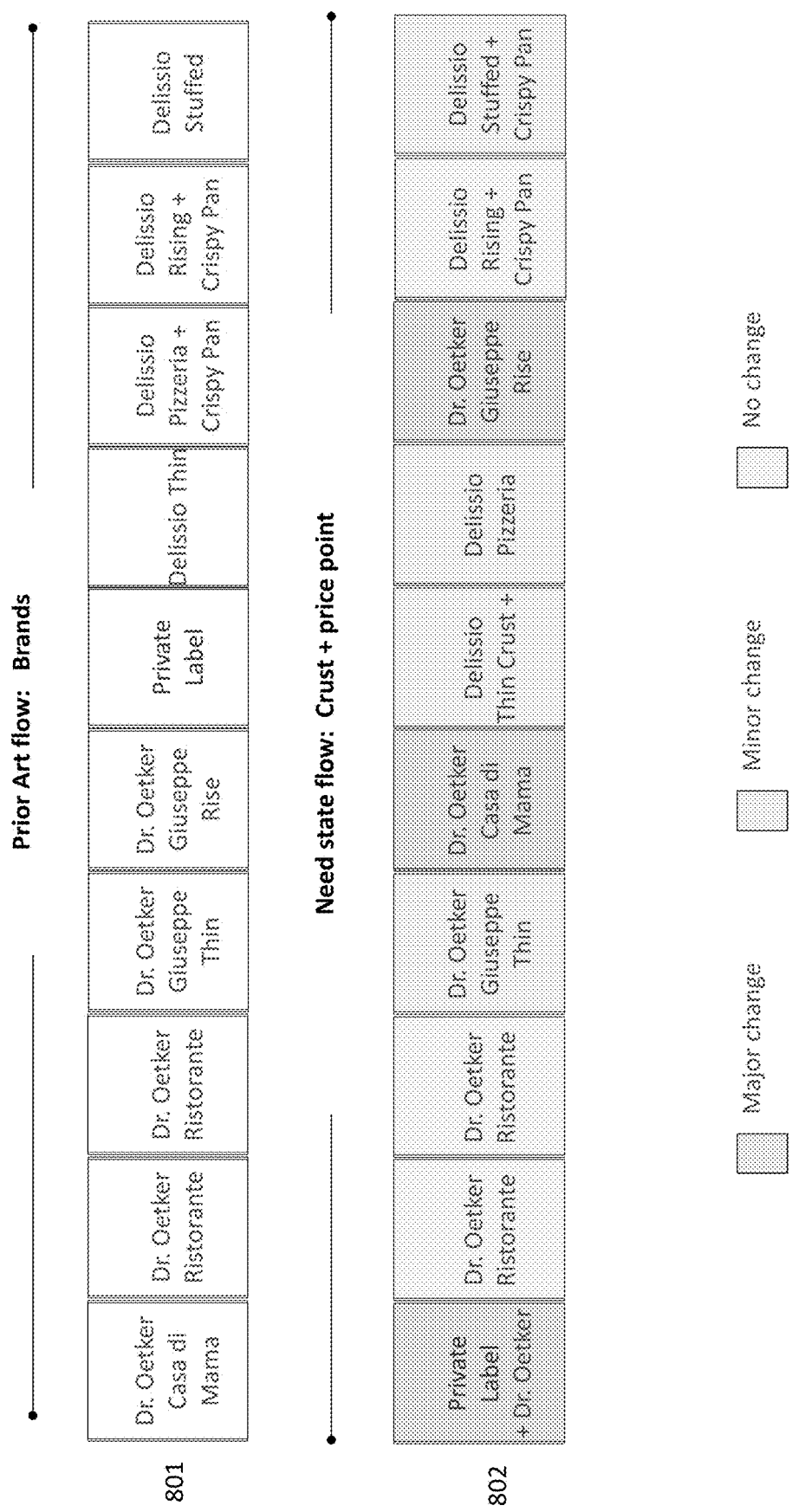
FIG. 8 illustrates a product adjacency example comparing the prior art method and a need states-based method. in accordance with an embodiment.

In most stores, items can be predominantly arranged by brand. FIG. 8 illustrates a product adjacency example 800 comparing arranging items by brand 801 and by need state 802 in accordance with an embodiment. Arranging a store by need state 802 may benefit the customer by placing all relevant items to a decision in front of them at once. Arranging a store by need state 802 may benefit the store by providing the store greater control in presentation of the store's facings to the customer. For example, a store may be able to better highlight a private label item, with a higher margin, in direct comparison to other similar products in the same need state.

Example: Offer Personalization

Need states may be used to improve offer personalization. A personalized offer may comprise generating a personalized digital marketing message. Digital marketing message may be transmitted through emails, SMS messages, webpages, applications, and phone calls. A system for generating marketing messaging is disclosed in U.S. Provisional Application No. 63/362,351. Such systems may filter or sort a series of items based on one or more attributes. A need state may be used as an attribute in said system. As a filter, need states may be used to automatically identify conflicting items in a message. For example, a customized message may be generated to market 10 products to a consumer. In the process of identifying the 10 items, the system may rank all items based on a set of rules. The system may then filter out any redundant items with the same need state. In other words, if the third and sixth highest ranked items were both in the need state "thin crust pizza," the sixth ranked item may be omitted from the list. As a sorting element, need states may be able to identify substitutions to items a consumer generally buys. For example, for a consumer that buys a specific brand item in the "thin crust pizza" need state commonly, a message may be generated which highlights that an alternative "thin crust pizza" brand is on sale this week or simply offer an alternative with a higher margin to the retailer.

Additionally, need states may simplify the processing required to identify items. Instead of sorting each SKU in a database, a system may evaluate a smaller set of need states. The personalized message may either recommend the need state itself, or one or more items within the need state. Purchase information associated with a need state may be stored in a database or derived from information associated with individual items. For example, a system may track the time since a customer bought a product in a need state.

Example: Promotion Optimization

Needs states may be used to optimize promotions. Promotions may be scheduled and generated based on interaction with a brand and/or the consumer. An issue with current methods of generating promotions is cannibalization of sales market (i.e., multiple products in similar spaces competing in the same promotional window). For example, a store may choose to not feature promotions for multiple items of the same need state in a marketing message, like a flyer. The store may set a time interval before featuring another item of the same need state again. In another example, a retail chain may inform a brand of scheduled promotions in the same need state to aid in scheduling the brand's promotion.

Example: Item Ranges

The system can identify whether there are excessive and/or inadequate items in a range of items from the density of items within a need state. For example, the system can analyze if there many items within the need state or only a few and/or one item. If a need state features many items, market share can be spread between the similar items within the need state. For example, if an Asian market sells 25 different types of Korean noodles that are very similar, customers are likely buying a random type of noodle. Thus, the store could cut down from 25 to 2 or 3, and customers may not care. If a need state only features a few items, a store can add an additional item, such as a home brand, to the need state. The system can identify an average amount of items per need state across all need states to provide a threshold for excessive and/or inadequate items in a need state. The average can be normalized based on the number of sales and/or average margin of the need state.

The system can also identify exclusivity and/or market share of an item based on sales and the density of items within a need state.

Example: Pricing

The system can identify pricing optimizations for items within a need state. Changes to pricing of an item within a need state can affect sales of other items within the need state. For example, if item A within a need state is on sale, item A may sell more units, while item B, within the same need state sells less. The system can find the optimal price for an item (e.g., a home brand) to maximize margin and sales within a need state. It should be noted that an extensive price change may cause an item to change need states.

Example: Loss and Categorical Accuracy

Figure 9:
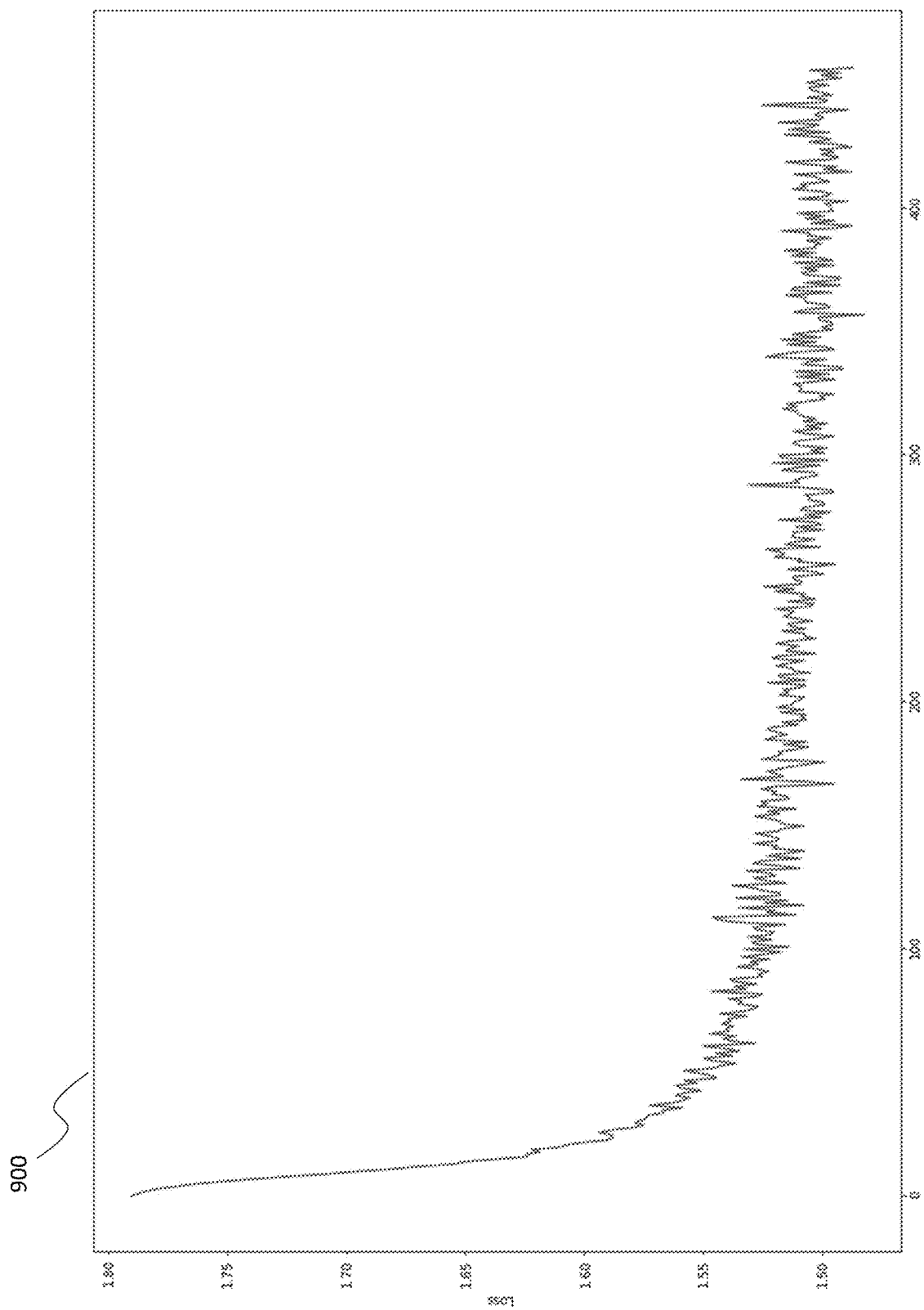
FIG. 9 depicts a graph of model loss over time, for an example dataset, in accordance with an embodiment.

Referring to FIG. 9, a graph 900 of model loss over time, for an example dataset, is depicted in accordance with an embodiment. Time is depicted in epochs (i.e., an iteration of training the model). In this example, the model loss for the algorithm decreased and then converged to a moderately consistent value between 100 and 200 epochs. A person of ordinary skill in the art will recognize that by changing the parameters of the machine learning algorithm, different values of model loss may exist during iterative training. The example graph 900 is presented merely to illustrate the convergent nature of the solution.

Figure 10:
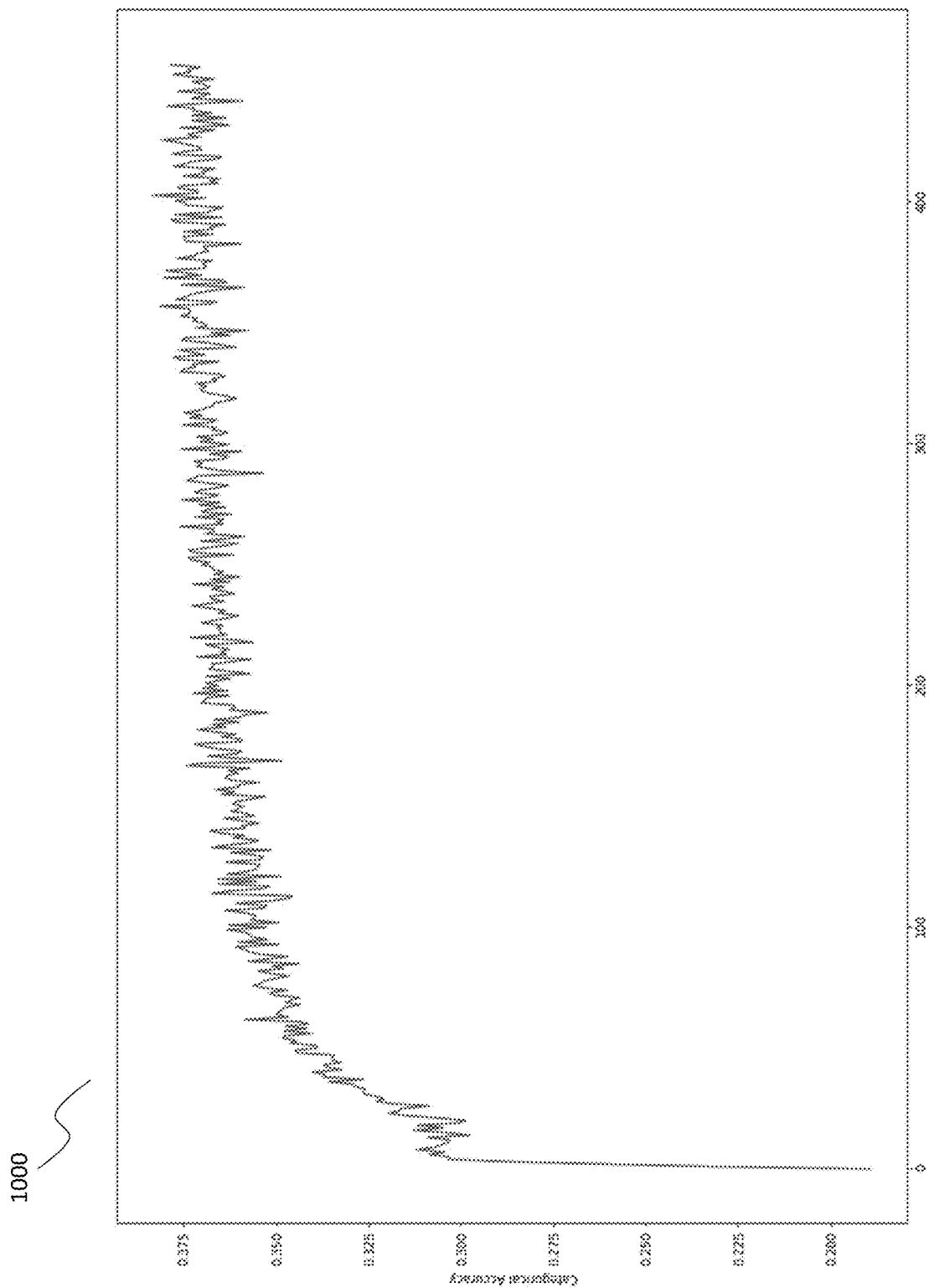
FIG. 10 depicts a graph of accuracy over time, for an example dataset, in accordance with an embodiment.

Referring to FIG. 10, a graph 1000 of accuracy over time, for an example dataset, is depicted in accordance with an embodiment. Time is depicted in epochs. In this example, the accuracy for the algorithm increased and then converged to a moderately consistent value between 100 and 200 epochs. A person of ordinary skill in the art will recognize that by changing the parameters of the machine learning algorithm, different values of accuracy may exist during iterative training. For example, a larger window for similarity between items of the same need state may increase accuracy at the expense of granularity. The example graph 1000 is presented merely to illustrate the convergent nature of the solution.

Example Code

Example functions are provided for illustrative purposes. The definition of a function is provided which can transform purchase history information into training data:

```
def generate_training_data(
    batch_size: int,
    sequences: list,
    window_size: int,
    num_ns: int,
    num_prods: int,
    seed: int,
    max_num_items: int,
    shuffle=True,
) -> tuple:
    """ Generator function can yield batches of training data containing lists of target products,
context products and labels
    Parameters
    -------------
    batch_size : int
        Size of the batch to yield
    sequences : list
        List of baskets and unique items purchased in each
    window_size : int
        Size of the window selecting for context products - for this use case window
        Size can be the length of the basket but to speed up training a smaller window
        is recommended
    num_ns : int
        The number of negative samples to select per positive sample
    num_prods : int
        The number of unique products in the product dictionary
    seed : int
        The seed for the negative sampling
    max_num_items : int
        The maximum number of items to consider for each customer, used to speed up
        training
    shuffle : bool
        Controls whether the sequence of customers should be shuffled between batches
        (defaults to True)
    Returns
    ---------
    targets : list
        List of target products
    contexts : list
        List of context products (including negative samples)
    labels : list
        Binary 0/1 indicator if the target/context pair were a positive sample (1) or
        negative sample (0)
    """
```

A function is provided which can generate embeddings:

```
contexts = Input(shape=(None, self.num_ns+1,1))
targets = Input(shape=(None,))
# Embedding for the target product
target_embedding = Embedding(
    self._num_prods, self._embedding_size, input_length=1,
name=self._item_embeddings_layer_name
    )(targets)
#Embedding for the context product
context_embedding = Embedding(
    self._num_prods, self._embedding_size,
    input_length=self.num_ns
    )(contexts)
```

The definition of a function is provided which can determine similarity between items:

```
def calc_cosine_sim(df: SparkDataFrame) -> SparkDataFrame:
    """"""
    Generates cosine similarity between items given a DataFrame with an
    ITEM_NO and embedding vector
    Parameters
    -------------
    df: str
        The DataFrame containing the ITEM_NO and embedding vector
    Returns
    ---------
    cosine_out: SparkDataFrame
        DataFrame containing the cosine similarity between items
    """"""
```

The definition of a function is provided which can generate a similarity matrix:

```
def create_dist_matrix(df: SparkDataFrame) -> DataFrame:
    """"Create a Pandas DataFrame containing the distance matrix of cosine
    similarity for input into Hierarchical Clustering
    Parameters
    ----------
    df : pyspark.sql.dataframe.DataFrame
        PySpark DataFrame containing the cosine similarity scores between two
        items
    Returns
    ---------
    final_df_pivot : DataFrame
        Pandas DataFrame containing the distance matrix of cosine similarities
    """"
```

The definition of a function is provided which can generate need states and a customer decision tree:

```
def create_dendro(
    dist_matrix: DataFrame,
    linkage_method: str,
    prod_path: str,
    color_thresh: float,
    generate_need_states: bool,
    need_state_cut_point: int,
) -> tuple:
    """"Create a dendrogram from the distance matrix
    Parameters
    -------------
    dist_matrix : DataFrame
        Distance matrix containing the cosine similarity between items as a
        Pandas
    DataFrame
    linkage_method : str
        The method to use for the linkage matrix
    prod_path : str
        Path to the product hierarchy
    color_thresh : int
        The threshold on which to color different clusters on the dendogram
    generate_need_states : bool
        Boolean to control if need lookup tables should be generated
    need_state_cut_point : int
        Cut point to generate need states
    Returns
    ---------
    plt : matplotlib.pyplot
        matplotlib plot object
    need_state_df : DataFrame
        DataFrame containing the item and need state number lookup
    """"
```

Example Embodiments

In some aspects, the techniques described herein relate to a computer-implemented method of identifying item substitutions including: collecting purchase history information, wherein the purchase history information includes one or more shopping episodes from one or more customers, wherein each shopping episode includes one or more purchased items; transforming the purchase history information into a matrix of observed substitutions; training a neural network on the matrix of observed substitutions to generate item embeddings; receiving input including an item; identifying a substitution similarity between the item and another item based on the item embeddings.

In some aspects, the techniques described herein relate to a computer-implemented method, wherein each item embedding corresponds to an item transformed into a vector within an n-dimensional space.

In some aspects, the techniques described herein relate to a computer-implemented method, wherein the item embeddings define a vector space configured such that items that are closer in the vector space are observed substitutions.

In some aspects, the techniques described herein relate to a computer-implemented method, wherein transforming the purchase history information into a matrix of observed substitutions further includes: creating a set of paired items; and qualifying the paired items on whether the paired of items were both bought by one of the one or more customers in different shopping episodes.

In some aspects, the techniques described herein relate to a computer-implemented method, further including qualifying the paired items as never purchased in the same shopping episode.

In some aspects, the techniques described herein relate to a computer-implemented method, wherein the set includes samples of more popular items more frequently.

In some aspects, the techniques described herein relate to a computer-implemented method, wherein identifying a substitution similarly between the item and another item based on the item embeddings further includes calculating a cosine similarity between the item and a potential substitution.

In some aspects, the techniques described herein relate to a computer-implemented method, further including generating a similarity matrix including the similarity between all items.

In some aspects, the techniques described herein relate to a computer-implemented method, further including generating a dendrogram, based on the similarity matrix, configured to represent a categorization of items based on decisions made by the one or more customers.

In some aspects, the techniques described herein relate to a computer-implemented method, further including clustering the similarity matrix to generate one or more customer need states.

In some aspects, the techniques described herein relate to a computer-implemented method, further including: receiving information associated with one or more spacings of a store; and determining an optimal item allocation within the one or more spacings based on the customer need states.

In some aspects, the techniques described herein relate to a computer-implemented method, further including: receiving information associated with the layout of a store; and determining an optimal item arrangement within a layout based on the customer need states.

In some aspects, the techniques described herein relate to a computer-implemented method, wherein training on the neural network on the matrix of observed substitutions to generate item embeddings further includes: iteratively converging a first item embedding and a second item embedding, responsive to the second item being observed as a substitute for the first item.

In some aspects, the techniques described herein relate to a computer-implemented method, further including initializing the first item embedding and second item embedding as a random value.

In some aspects, the techniques described herein relate to a computer-implemented method, further including automatically generating a customized marketing message based on the purchase history information and the purchased items' need states.

In some aspects, the techniques described herein relate to a computer-implemented method, further including determining an item density within a need state and identifying a range of items to be sold based on the item density.

In some aspects, the techniques described herein relate to a computer-implemented method, wherein the one or more purchased items are identified via a Stock Keeping Unit (SKU).

In some aspects, the techniques described herein relate to a computer-implemented method, further comprising accepting SKU information using a scanner.

In some aspects, the techniques described herein relate to a computer-implemented method, further comprising accepting need state information associated with one or more products, and customer information associated with a customer and historical customers, transforming the need state information and customer information into standardized attribute information, wherein the standardized attribute information comprises attributes associated with each of the one or more need states, storing the standardized attribute information; defining a message recipe based on the presence of a subset of the one or more attributes, ranking the one or more need states based on subset of the one or more attributes, defining a message action based on message and a message template, selecting one or more products based on the ranking of the one more need states, automatically generating a message comprising the message action and at least one of the one or more products, and transmitting the message to the customer over the network.

Example Computer System

Figure 11:
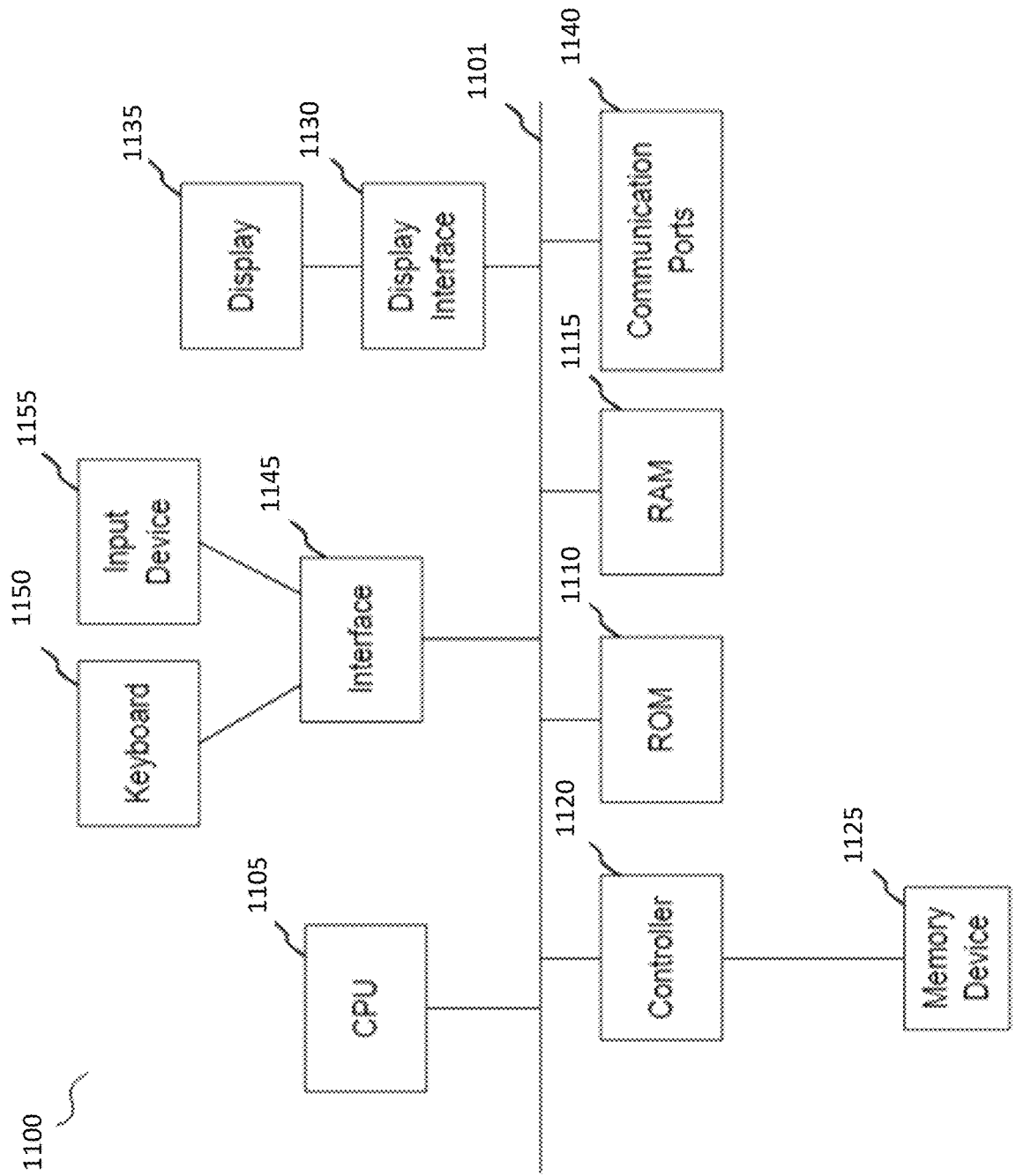
FIG. 11 depicts a block diagram of exemplary data processing system comprising internal hardware that may be used to contain or implement various computer processes and systems.

FIG. 11 depicts a block diagram of exemplary data processing system 1100 comprising internal hardware that may be used to contain or implement the various computer processes and systems as discussed above. In some embodiments, the exemplary internal hardware may include or may be formed as part of a database control system. In some embodiments, the exemplary internal hardware may include or may be formed as part of an additive manufacturing control system, such as a three-dimensional printing system. A bus 1101 serves as the main information highway interconnecting the other illustrated components of the hardware. CPU 1105 is the central processing unit of the system, performing calculations and logic operations required to execute a program. CPU 1105 is an exemplary processing device, computing device or processor as such terms are used within this disclosure. Read only memory (ROM) 1110 and random access memory (RAM) 1115 constitute exemplary memory devices.

A controller 1120 interfaces with one or more optional memory devices 1125 via the system bus 601. These memory devices 1125 may include, for example, an external or internal DVD drive, a CD ROM drive, a hard drive, flash memory, a USB drive or the like. As indicated previously, these various drives and controllers are optional devices. Additionally, the memory devices 1125 may be configured to include individual files for storing any software modules or instructions, data, common files, or one or more databases for storing data.

Program instructions, software or interactive modules for performing any of the functional steps described above may be stored in the ROM 1110 and/or the RAM 1115. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 1130 can permit information from the bus 1101 to be displayed on the display 1135 in audio, visual, graphic or alphanumeric format. Communication with external devices can occur using various communication ports 1140. An exemplary communication port 1140 can be attached to a communications network, such as the Internet or a local area network.

The hardware can also include an interface 1145 which allows for receipt of data from input devices such as a keyboard 1150 or other input device 1155 such as a mouse, a joystick, a touch screen, a remote control, a pointing device, a video input device and/or an audio input device.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:
1. A computer-implemented method of identifying item substitutions comprising:
collecting history information, wherein the history information comprises one or more shopping episodes from a plurality of customers, wherein each shopping episode comprises one or more purchased items;
transforming the history information into a matrix of observed substitutions, wherein an observed substitution comprises an alternative item;
defining dimension information and structure information for a neural network, wherein the dimension information defines an n-dimensional space;
training the neural network on the matrix of observed substitutions to generate item embeddings, wherein the training comprises iteratively converging a first item embedding and a second item embedding, responsive to the second item being observed as a substitute for the first item, wherein the first and second item embedding are vectors in the n-dimensional space;
receiving input comprising an item; and
identifying a substitution similarity between the item and another item based on the item embeddings.

2. The computer-implemented method of claim 1, wherein the item embeddings define a vector space configured such that items that are closer in the vector space are observed substitutions.

3. The computer-implemented method of claim 1, wherein transforming the purchase history information into a matrix of observed substitutions further comprises:
creating a set of paired items; and
qualifying the paired items on whether the paired of items were both bought by one of the plurality of customers in different shopping episodes.

4. The computer-implemented method of claim 3, further comprising qualifying the paired items as never purchased in a single shopping episode.

5. The computer-implemented method of claim 3, wherein the set comprises samples of more popular items more frequently.

6. The computer-implemented method of claim 1, wherein identifying a substitution similarly between the item and another item based on the item embeddings further comprises calculating a cosine similarity between the item and a potential substitution.

7. The computer-implemented method of claim 1, further comprising generating a similarity matrix comprising the similarity between all items.

8. The computer-implemented method of claim 7, further comprising generating a dendrogram, based on the similarity matrix, configured to represent a categorization of items based on decisions made by the plurality of customers.

9. The computer-implemented method of claim 7, further comprising clustering the similarity matrix to generate one or more customer need states.

10. The computer-implemented method of claim 9, further comprising:
receiving information associated with one or more spacings of a store; and
determining an optimal item allocation within the one or more spacings based on the customer need states.

11. The computer-implemented method of claim 9, further comprising:
receiving information associated with a layout of a store; and
determining an optimal item arrangement within the layout based on the customer need states.

12. The computer-implemented method of claim 1, further comprising initializing the first item embedding and second item embedding as a random value.

13. A computer-implemented system for identifying item substitutions comprising:
a processor, the processor configured for:
collecting history information, wherein the history information comprises one or more shopping episodes from a plurality of customers, wherein each shopping episode comprises one or more purchased items;
transforming the history information into a matrix of observed substitutions, wherein an observed substitution comprises an alternative item;
defining dimension information and structure information for a neural network, wherein the dimension information defines an n-dimensional space;
training the neural network on the matrix of observed substitutions to generate item embeddings, wherein the training comprises iteratively converging a first item embedding and a second item embedding, responsive to the second item being observed as a substitute for the first item, wherein the first and second item embedding are vectors in the n-dimensional space;
receiving input comprising an item; and
identifying a substitution similarity between the item and another item based on the item embeddings.

14. The system of claim 13, wherein the item embeddings define a vector space configured such that items that are closer in the vector space are observed substitutions.

15. The system of claim 13, wherein transforming the purchase history information into a matrix of observed substitutions further comprises:
creating a set of paired items; and
qualifying the paired items on whether the paired of items were both bought by one of the plurality of customers in different shopping episodes.

16. The system of claim 15, wherein the processor is configured for:
qualifying the paired items as never purchased in a single shopping episode.

17. The system of claim 15, wherein the set comprises samples of more popular items more frequently.

18. The system of claim 13, wherein identifying a substitution similarly between the item and another item based on the item embeddings further comprises calculating a cosine similarity between the item and a potential substitution.

19. The system of claim 13, wherein the processor is configured for:
generating a similarity matrix comprising the similarity between all items.

20. The system of claim 19, wherein the processor is configured for:
generating a dendrogram, based on the similarity matrix, configured to represent a categorization of items based on decisions made by the plurality of customers.

21. The system of claim 19, wherein the processor is configured for:
clustering the similarity matrix to generate one or more customer need states.

22. The system of claim 21, wherein the processor is configured for:
receiving information associated with one or more spacings of a store; and
determining an optimal item allocation within the one or more spacings based on the customer need states.

23. The system of claim 21, wherein the processor is configured for:
- receiving information associated with a layout of a store; and
- determining an optimal item arrangement within the layout based on the customer need states.

24. The system of claim 13, wherein the processor is configured for:
- initializing the first item embedding and second item embedding as a random value.

* * * * *